United States Patent [19]
Ott

[11] 3,952,769
[45] Apr. 27, 1976

[54] ALIGNMENT CONTROL APPARATUS FOR CENTER PIVOT IRRIGATION EQUIPMENT

[75] Inventor: Eduard Karl Ott, Bothell, Wash.
[73] Assignee: Frontier Machinery Company, Walla Walla, Wash.
[22] Filed: Nov. 13, 1976
[21] Appl. No.: 523,225

[52] U.S. Cl. ............................. 137/344; 239/212
[51] Int. Cl.² ..................................... B05B 9/02
[58] Field of Search .................. 137/344; 239/212; 251/65; 335/205, 52, 151, 153, 174

[56] References Cited
UNITED STATES PATENTS
3,051,805   8/1962   Binford ........................... 335/205 X
3,807,436   4/1974   Pringle ............................. 137/344
3,823,730   7/1974   Sandstrom ........................ 137/344

Primary Examiner—Martin P. Schwadron
Assistant Examiner—Robert J. Miller
Attorney, Agent, or Firm—Wells, St. John & Roberts

[57] ABSTRACT

An alignment control apparatus is described for maintaining the pipe sections of center pivot irrigation equipment in substantial linear alignment. The apparatus includes a proximity switch mounted in a water-sealable enclosure adjacent one wall and an exterior proximity element mounted on a lever for movement in response to the articulation of the joint interconnecting adjacent pipe sections. The proximity switch when operated energizes a solid state contactor which in turn energizes an electrical drive motor to propel a pipe section.

9 Claims, 12 Drawing Figures

U.S. Patent  April 27, 1976  3,952,769
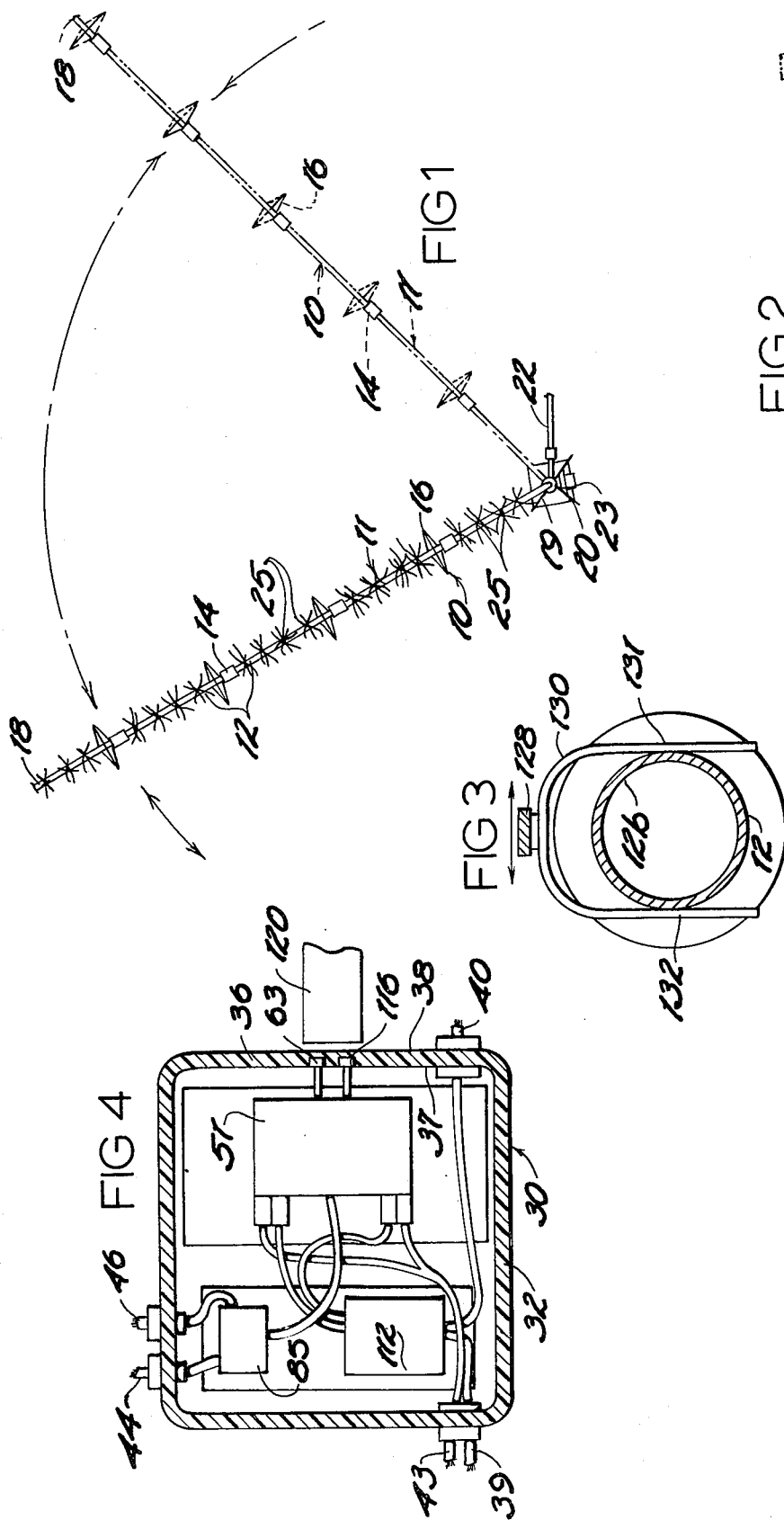
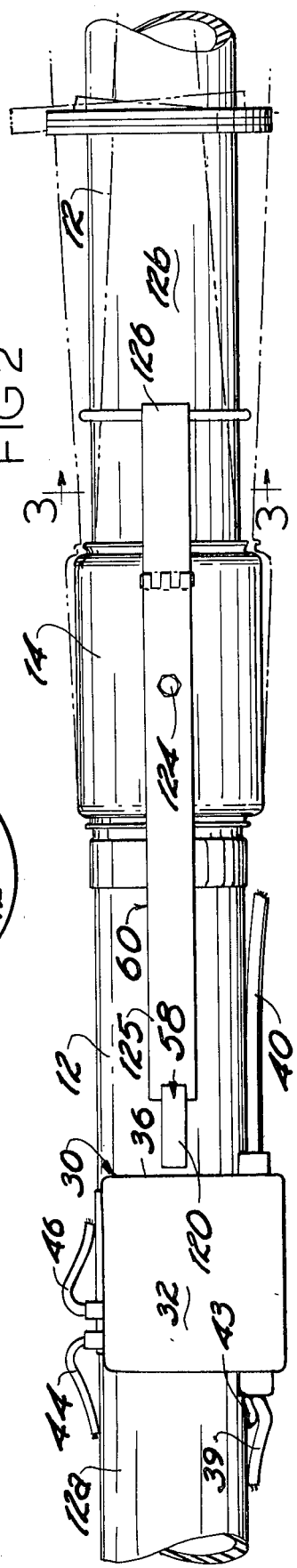

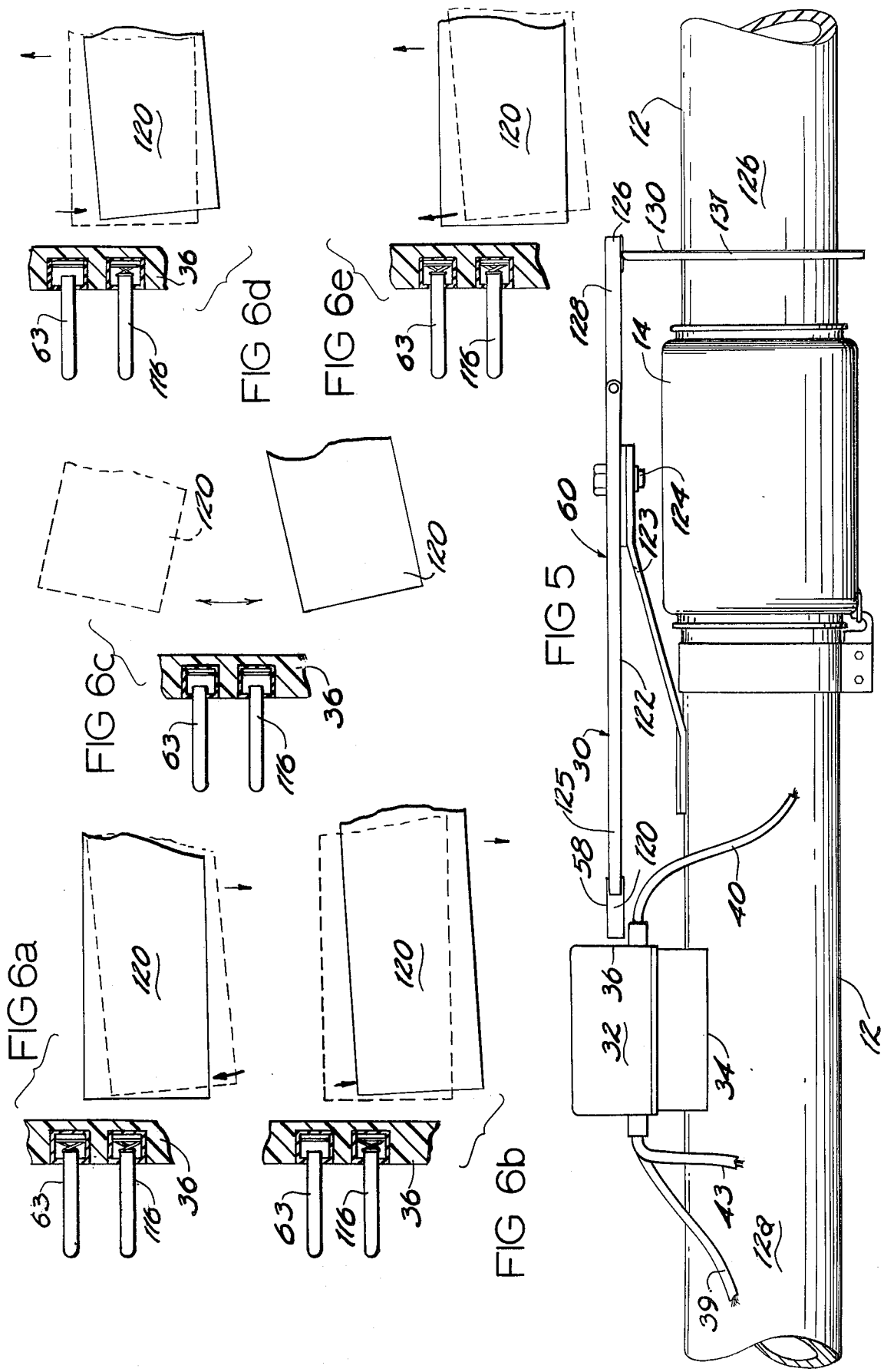

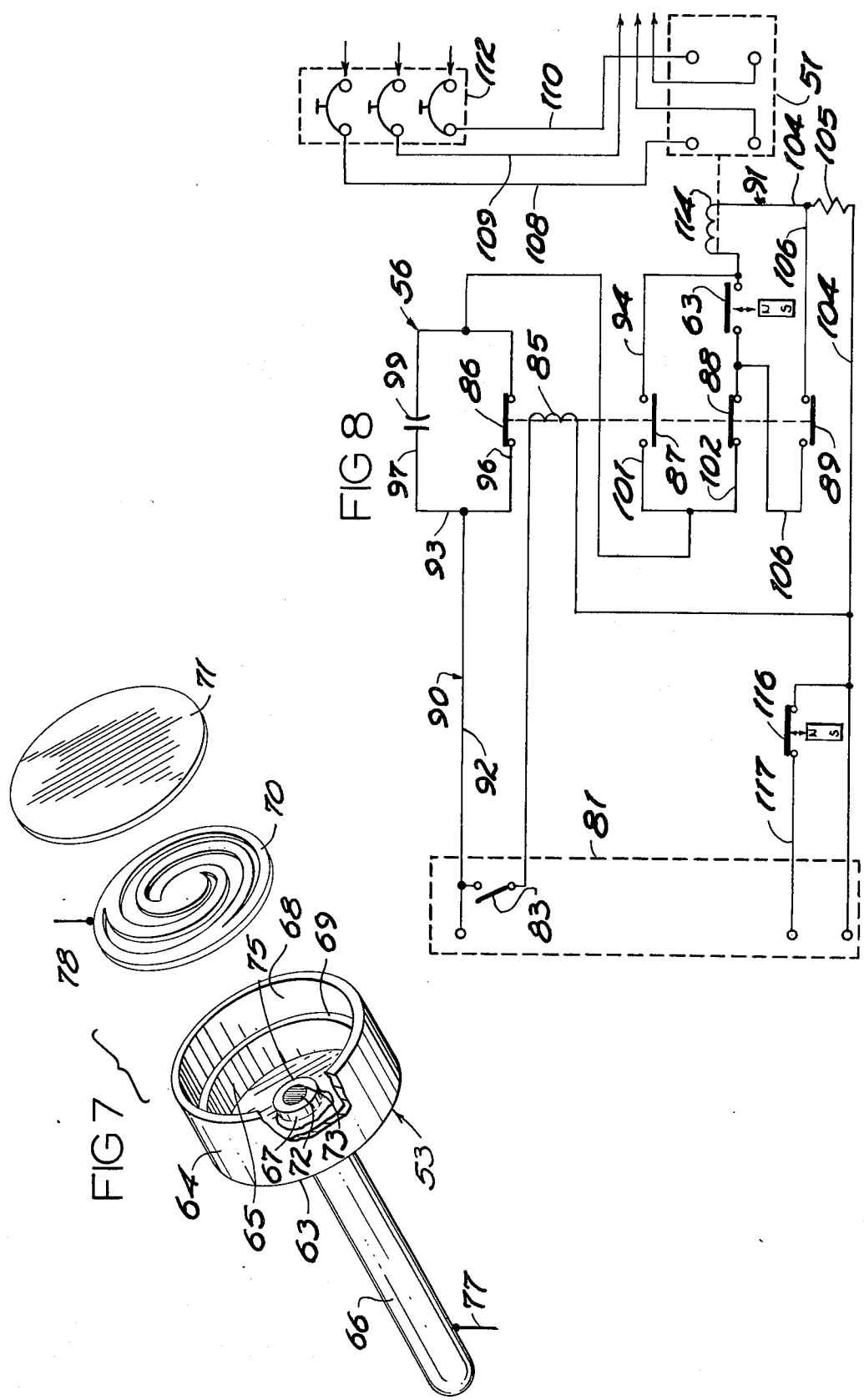

ALIGNMENT CONTROL APPARATUS FOR CENTER PIVOT IRRIGATION EQUIPMENT

BACKGROUND OF THE INVENTION

This invention relates to self-propelled irrigation equipment and more particularly to alignment control systems for maintaining self propelled irrigation equipment in substantial linear alignment.

Center pivot irrigation equipment has become well known in the irrigation industry. Such equipment consists of a water distribution conduit that is composed of a plurality of pivotally interconnected pipe sections. The water distribution conduit is pivoted about one end in an arcuate manner to distribute water over a field.

Numerous alignment devices have been devised for maintaining pipe sections in substantial linear alignment with each other as the water distribution conduit is pivoted over the field in a circular or arcuate path. Many of the alignment control devices are disclosed in patents classified in the U.S. Patent Office under Class 137, Subclass 344 and Class 239, Subclass 212.

One particular arrangement is illustrated in U.S. Pat. No. 3,807,436 granted to Pringle on Apr. 30, 1974. The Pringle patent describes an electrical-mehcanical system utilizing micro-switches.

Recently, attempts have been made to apply electronic solid state technology to the alignment control systems. One such effort is described in U.S. Pat. No. 3,823,730 granted July 16, 1974 to Sandstrom et al. The Sandstrom patent shows a rather complicated alignment control system utilizing a transistor-operational amplifier type solid state control network.

One of the principal objects of this invention is to provide an improved alignment system for center pivot irrigation system which has an extended life over present alignment systems.

An additional object of this invention is to provide an alignment control system which is more reliable and yet less expensive to manufacture than previous systems.

The further object of this invention is to provide an alignment control device having a minimum of components and which also is very reliable.

These and other objects and advantages of this system will become apparent upon the reading of the following detailed description of a preferred embodiment.

BRIEF DESCRIPTION OF THE DRAWINGS

A preferred embodiment of this invention is illustrated in the accompanying drawings, in which:

FIG. 1 is a schematic plan view of a center pivot irrigation system moving in an arcuate path over the ground, utilizing the present invention:

FIG. 2 is a sectional plan view of a portion of the irrigation system illustrating a joint between two pipe sections with an alignment control apparatus with a control box for maintaining substantial linear alignment between the two pipe sections;

FIG. 3 is a vertical cross-sectional view taken along line 3—3 in FIG. 2

FIG. 4 is a fragmentary plan section view of the control box and its interior

FIG. 5 is a side view of the joint illustrated in FIG. 3;

FIGS. 6a–6e show a sequence of views illustrating the operation of proximity switches in relation to pivotal movement of a pipe sections relative to each other;

FIG. 7 is an expanded isolated view showing one of the proximity switches to illustrate the switch structure; and FIG. 8 is an electrical schematic view of the electrical portion of the alignment control apparatus.

DETAILED DESCRIPTION OF A PREFERRED EMBODIMENT

Referring now in detail to the drawings, as illustrated in FIGS. 1 and 2, there is a self-propelled center pivot irrigation system designated with the numeral 10, that is pivotable about one end to distribute water over the ground in an arcuate path for irrigation purposes. The system 10 includes an elongated water distribution conduit 11 formed of a plurality of articulating pipe sections 12 that are pivotally interconnected to each other at joints 14. Each joint 14 includes an interconnection or coupling (not shown) interconnecting the two adjacent pipe sections. A multitude of various types of articulating pipe couplings may be employed. For purposes of illustration, in FIGS. 4 and 5 the inboard pipe section at each joint will be referred to as pipe section 12a and the outboard as pipe section 12b.

Each pipe section 12 is supported on a mobile frame or carriage 16. The mobile frame 16 supports the pipe section above ground level. Each frame 16 is driven by an independent constant speed electric motor (not shown). Preferably, the electric drive motors are reversible and it is further preferable that they be rated to operate on a 480-volt (RMS) and 3-phase electrical system.

The water distribution conduit 11 has a conduit outer end 18 and a conduit inner end 19. The inner conduit end 19 is connected to a fixed center pivot frame 20. Water is supplied to the water distribution conduit 11 at the center pivot frame 20 through a source conduit 22. A swivel joint 23 interconnects the source conduit with the water distribution conduit 11. Sprinkler nozzles 25 are mounted at spaced intervals along the water distribution conduit for distributing water as the irrigation system is propelled in an arcuate path about the center pivot frame 20.

The principal aspect of this invention lies in an alignment control system for maintaining the pipe sections 12 in general linear alignment with each other as the mobile frames carry the water distribution conduit 11 in the arcuate path. The alignment control system is designed to maintain the pipe sections aligned in either the forward direction (clockwise), or in the reverse direction (counter-clockwise), as viewed in FIGS. 1 and 2. The alignment control system includes an alignment control apparatus 30 adjacent each joint 14 for controlling operation of the electric motor on respective mobile frame 16.

The alignment control apparatus 30 includes an enclosure or box 32 that is water-sealable and is mounted on and secured to pipe section 12a by bracket 34 (FIG 5). Enclosure 32 has a nonmagnetic wall 36 facing the joint 14. Preferably, enclosure 32 is constructed of plastic or fiberglass material which may be hermeticall sealed to prevent moisture from entering the enclosure The wall 36 has an inside surface 37 and an outsid surface 38. The enclosure 32 receives a power cable 3 that extends into the enclosure from a power source preferably, a 3-phase 480-volt (RMS) source. A powe cable 40 extends from the enclosure to the next adja cent outboard unit. Additionally, the enclosure re ceives a power cable 43 extending from the electri motor on the respective mobile frame 16. A control cable 44 extends into the enclosure from a central panel adjacent the center pivot frame. A control cable 46 extends from the enclosure to the next unit.

The alignment control apparatus 30 further includes a solid state contactor or relay 51 mounted within enclosure 32 for selectively transmitting power to the electric motor.

Alignment control apparatus 30 further includes a proximity switch means 53 mounted within the enclosure 32, adjacent wall 36. An electrical control network 56 operatively interconnects the proximity switch means 53 and the solid state contactor 51 for energizing the electric motor in response to the operation of the proximity switch means 53.

The apparatus 30 further includes a proximity element 58 for activating the proximity switch means 53. The proximity element 58 is mounted exterior of the enclosure adjacent the wall 36 for non-contact activation of the switch means 53. Means 60 is provided that is responsive to the relative pivotal movement of the adjacent pipe sections 12a and 12b about the joint 14 for supporting and moving proximity element 58 with respect to proximity switch means 53 to activate and de-activate the proximity switch means 53 without physical contact. The proximity switch means 53 and the proximity element 58 are matched so that the means 53 is able to sense the presence and absence of the element 58 from a noncontact position adjacent the switch means 53, and thereby perform a switching function.

In a preferred embodiment, the proximity switch means 53 comprises a magnetically operated proximity switch 63 and more specifically a mercury wetted, disc type reed switch. Switch 63 includes a housing 64 having a cup section 65 constructed of a nonmagnetic, electrically conductive metal material. A metal pin 66 is mounted to the cup 65 with one end of the pin extending into the base of the cup through a glass seal 67. Pin 66 is preferably constructed of a magnetic metal material. Cup 65 forms a cavity 68 having a shoulder 69 therein for receiving a flat disc-spring armature 70 which is constructed of a magnetic material. Switch 63 has a cover 71 constructed of a metal material for enclosing cavity 68. The pin 66 has a hollow core 72 that is filled with mercury 73. The pin 66 has an opening communicating with the cup cavity 68, forming a mercury wetted contact area 75. During the construction of the switch 63, the unit is sealed in hydrogen to prevent the interior from becoming contaminated. The switch 63 has a terminal 77 connected to the pin 66 and a terminal 78 connected to the flat spring armature 70, so that when the armature 70 contacts the mercury wetted contact area 75, current is permitted to flow between the terminals.

Although a magnetic proximity switch is illustrated in the preferred embodiment, it should be understood that other types of proximity switches may be also utilized without deviating from the principles of this invention. Such other proximity switches may include "Hall effect" switches, inductance type proximity switches, and capacitance type proximity switches that sense the presence of a metallic, generally ferric element.

As shown in FIG. 8, the irrigation system includes a forward-reverse switch 83 that is generally mounted at the main panel. The switch 83 is generally manually operated to designate either forward or reverse travel. The forward-reverse switch 83 is operatively connected to a forward-reverse relay 85 positioned in the enclosure 32. Forward-reverse relay 85 has two normally closed contacts 86 and 88, and two normally open contacts 87 and 89 which form a portion of the electrical control network.

Electrical control network 56 generally comprises a switching circuit 90 and a contactor activation circuit or contactor triggering circuit 91. Switching circuit 90 includes a control line 92 that extends from the main panel 81 having sub-circuits 92 and 94 that are connected in series. Sub-circuit 83 includes a branch line 96 and a parallel branch line 97. Contact 86 is mounted in branch line 96 in parallel with an impeder 99 mounted in branch line 97. The impeder 99 has an impedance value sufficient to create a voltage drop across the impeder without preventing operation of the contactor 51. Preferably, the impeder 99 is a capacitor. Alternatively, the impeder 99 may be a resistor.

Sub-circuit 94 includes a branch line 101 having contacts 87 mounted therein and a parallel branch line 102 having normally closed contacts 88 mounted therein. Magnetic proximity switch 63 is mounted in the branch line 102 in series with the contacts 88.

Electrical control network 56 includes a return control line 104 that extends from the contactor 51 to the main panel. Return line 104 has a resistor 105 mounted therein. A ground line 106 extends from the branch line 102 intermediate the contacts 88 and the magnetic proximity switch 63 to return control line 104. Ground line 106 has contacts 89 mounted therein.

The power cable 39 includes power lines 108, 109, 110 which are operatively connected to the contactor 51. Lines 108, 109 and 110 have circuit breaker means 112 mounted therein for interrupting the electrical power under overload conditions and also for power isolation purposes.

The contactor 51 is preferably a solid state contactor described and claimed in U.S. application Ser. No. 523,226 entitled "Solid State Alternating Current Switching Device" filed Nov. 13, 1974. Such patent application is incorporated by reference herein as a preferred example of a solid state contactor. Other types of solid state contactors may be utilized depending upon the particular application and voltage requirements. It is desirable that solid state contactor 51 have a zero voltage switching capability.

The contactor control circuit 91 includes a relay 114 for operating the contactor 51 in response to the operation of the magnetic proximity switch 63. The impedance of the relay 114 and of the impeder 99 are matched so that the relay 114 is capable of operating at a reduce applied voltage in the reverse operational mode.

Additionally, the apparatus 30 includes a shutdown proximity switch 116 mounted to the inside of surface 36 adjacent the switch 63. Preferably, the shutdown proximity switch 116 is a magnetically operated switch similar to switch 63. The alignment control system further includes a shutdown circuit 117 which incorporates proximity switch 116 for causing the entire system to shut down should the proximity switch 116 be opened.

The proximity element 58, in a preferred embodiment, comprises a permanent magnet 120 for operating the magnetically operated proximity switches 63 and 116.

In a preferred embodiment, the means 60 includes a lever or arm 122 that is pivotally supported on a bracket 123 that extends from one of the pipe sections 12. The lever 122 is supported for rotational movement about a vertical stub shaft 124 between ends 125 and 126. The shaft 124 is aligned with the vertical pivot axis of the joint 14. End 125 is affixed to the magnet 120 and supports the magnet 120 in a path exterior but adjacent to the wall 36. The magnet is moved to and from a non-contact activation position directly opposite the switches 63 and 116.

The end 126 has a hinged portion 128 for enabling the end 126 to articulate upward and downward as the system is propelled over land. End 126 has an inverted U-shaped guide 130 affixed thereto that straddles the pipe section 12b. U-shaped guide 130 has a leg 131 extending downward along one side of the pipe section, and a leg 132 extending downward for engaging the other side of the pipe section.

The operation of the alignment control system is described utilizing FIGS. 6 and 8, for illustration purposes. The end motor is generally energized continuously with the remaining motors being energized intermittently in response to the angular variations between adjacent pipe sections.

It is assumed that the forward-reverse switch 83 is in the open or forward mode with the relay 85 de-energized, in which the relay contacts 85 and 88 are closed, and the contacts 87 and 89 are open. As the outboard pipe section 12b moves forward in a clockwise motion, the magnet 120 is moved toward switch 63 to cause switch 63 to close, (FIG. 6a). When switch 63 closes, the control voltage is supplied to the relay 114 for activating the contactor 51. When the contactor 51 operates, the electrical motor is energized to drive the respective mobile frame forward causing the magnet 120 to move counter-clockwise. When the magnetic field of magnet 120 is no longer sufficient to affect switch 63, it opens, causing the electrical motor to stop (FIG. 6b). It should be noted the magnetic field of the magnet 120 maintains the shutdown switch 116 closed to permit continued operation of the system. Should one of the electrical motors fail, the system will become sufficiently out of line that the magnet will move away from the switch 116 causing switch 116 to open and thus discontinue the operation of the irrigation system (FIG. 6c).

In the reverse mode, the switch 83 is activated to operate the relay 85 to open contacts 86 and 88 and close contacts 87 and 89 respectively. In the reverse mode, the switch 63 operates just opposite to the way it operates in the forward mode. That is; When the switch 63 is closed the relay 114 is de-energized and when the switch 63 is open, the relay 114 is energized. With contact 86 open, the control voltage is applied partially acorss the impeder 99 and partially across the relay 114 and resistor 105. As previously mentioned; the impedances of the impeder 99 and the relay 114 are complementary so as to enable the contactor 51 to be operated when switch 63 is open and to prevent overloading resistor 105 when the switch 63 is closed. The impedance of the impeder 99 is calculated so that the full voltage is dissipated across the impeder 99 and resistor 105 when the switch 66 is closed. A capacitor is preferred so as not to convert the energy to heat in the enclosure 32.

When moving in a reverse condition the outboard pipe section 12b moves counter-clockwise about the joint 15 causing the lever 122 to pivot counter-clockwise with respect to its pivot axis (FIG. 6d). This movement causes the magnet to move away from the switch 63 causing the switch to open, thus permitting power to be applied to the relay 114 to operate the contactor 51. After the motor has operated to move the inboard pipe section 12b into alignment, (FIG. 6e), the magnet moves to operate or close switch 63 to ground the circuit through the ground line 106 and thereby deactivate the relay 114. With such a system, a single magnetically operated switch 63 may be utilized for controlling both forward and reverse movement. Likewise, should the system be so far out of alignment that the magnet moves away from the shutdown switch 116, the opening of switch 117 will cause the entire system to be shut down.

Consequently, the distribution conduit 11 is progressively moved about the central frame 20 in a substantially straight line, with the pipe sections being permitted to articulate slightly in the horizontal plane to activate the respective carriage drive motors. The alignment control system as described enables the conduit to be maintained much straighter than with previous alignment control systems and is much more reliable.

It should be understood that the above described embodiments are simply illustrative of the principles and objects of this invention and numerous other embodiments may be readily devised without deviating from the applicant's invention.

What is claimed as the invention is:

1. Alignment control apparatus for a self-propelled center pivot irrigation system having a plurality of pipe sections pivotally interconnected to form an elongated multi-joint water distribution conduit, with each pipe section being supported by a respective mobile frame having a reversible electric drive motor thereon to propel the mobile frame in reversible arcuate paths about one end of the conduit, in which the alignment control apparatus maintains the pipe sections in general longitudinal alignment as the conduit is pivoted in the arcuate paths, comprising:

an enclosure associated with a pipe section;
a solid state contactor mounted in the enclosure and electrically connected to the electrical motor for applying electrical power to the electric motor to propel the pipe section;
a magnetically operable electrical switch mounted in the enclosure having a stable state and an unstable state;
a movable magnetic element generating a magnetic field;
means responsive to the pivotal movement of the adjacent section about a common joint for moving the magnetic element into magnetic field alignment with the electrical switch to change the electrical switch from the stable state to the unstable state and for moving the magnetic element out of magnetic field alignment with the magnetic switch to permit the switch to automatically change from the unstable state to the stable state;
electrical control network operatively connected between the magnetically operable electrical switch and the solid state contactor and having (1) a forward operational mode circuit means for energizing the solid state contactor when the electrical switch is in the unstable state to drive the mobile frame in a forward arcuate direction and for de-energizing the solid state contactor when the electrical switch is in the stable state to stop the forward arcuate movement of the mobile frame, and (2) a reverse operational mode circuit means for energizing the solid state contactor when the electrical switch is in the stable state to drive the mobile frame in a reverse arcuate direction and for de-energizing the solid state contactor when the electrical switch is in the unstable state to stop the reverse arcuate movement of the mobile frame.

2. The alignment control apparatus as defined in claim 1 wherein the electrical control network includes:
   a forward-reverse relay having a normally closed contact;
   a triggering relay for energizing the solid state contactor;
   said normally closed relay contact and magnetically operable electrical switch being connected in series to the triggering relay to apply a control voltage to the triggering relay when the magnetically operable electrical switch is in the unstable state and the normally closed contact is closed.

3. The alignment control apparatus as defined in claim 2 wherein the forward reverse relay has two normally opened contacts, one of which is connected in parallel with the normally closed contact, and the other being connected in series with the magnetically operable electrical switch and electrically grounded so that when the forward-reverse relay is energized and the magnetically operable electrical switch is in the stable state, the control voltage will energize the triggering relay to drive the mobile frame in the opposite direction, and so that when the forward reverse relay is energized and the magnetically operable electrical switch is in the unstable state, the control voltage is grounded to prevent the triggering relay from being energized.

4. The alignment control apparatus as defined in claim 3 wherein the forward-reverse relay has a second normally closed contact in series with the magnetically operable electrical switch and wherein the electrical control network includes an impeder of a selected impedance mounted in parallel with the second normally closed contact of the forward-reverse relay to prevent an electrical overload, when the control voltage is grounded.

5. The alignment control apparatus as defined in claim 4 wherein the impeder is a capacitor.

6. The alignment control apparatus as defined in claim 1 further comprising:
   a second magnetically operable electrical switch mounted in the enclosure adjacent the first magnetically operable electrical switch;
   said second magnetically operable electrical switch having an ustable state and a stable state in which the second magnetically operable electrical switch is operable to the unstable state when the metallic element is positioned in a non-contact magnetic field alignment with the second magnetically operable electrical switch;
   a shutdown circuit operatively connected to a second magnetically operable electrical switch for discontinuing electric power to the solid state contactor to prevent movement of the mobile frame when the second magnetically operable electrical switch is in the stable state.

7. An alignment control system for a self-propelled center pivot irrigation system having a plurality of pipe sections pivotally interconnected to form an elongated multi-joint water distribution conduit, with each pipe section being supported by a respective mobile frame having a reversible electric drive motor thereon to propel the mobile frame in reversible arcuate paths about one end of the conduit, in which the alignment control apparatus maintains the pipe sections in general longitudinal alignment as the conduit is pivoted in either of the arcuate paths, comprising:
   a water-sealable enclosure associated with a mobile support; said enclosure having a non-magnetic wall;
   a contactor mounted in the enclosure and electrically connected between an electrical power source and the electrical drive motor;
   a magnetically operated electrical switch mounted in the enclosure adjacent to non-magnetic wall and operatively electrically connected to the contactor for energizing the contactor;
   a magnetic field generating means supported exterior of the enclosure adjacent the nonmagnetic wall with the magnetic field directed through the non-magnetic wall;
   means for moving the magnetic field generating means with respect to the switch and in relation to the pivotal movement of an adjacent pipe section about the common joint to operate the electrical switch when the switch is in the effective magnetic field of the magnetic field generating means to selectively activate the contactor and operate the drive motor to propel the pipe section over the ground with the respective pipe section in the desired alignment with the alignment pipe section.

8. The alignment control apparatus as defined in claim 7 further comprising:
   an electrical control network operatively connecting the magnetically operated switch with the contactor;
   said network having a forward drive mode and a reverse drive mode;
   said electrical control network having means for energizing the contactor to activate the electrical motor in the forward arcuate path when the network is in the forward drive mode and the magnetic switch is closed and for energizing the contactor to activate the electrical motor in the reverse arcuate path when the network is in the reverse drive mode and the magnetic switch is open.

9. The alignment control apparatus as defined in claim 7 wherein the means for moving the magnetic field generating means includes a lever mounted for rotational movement at about the common joint, said lever having one end engaging the adjacent pipe section and the other end supporting the magnetic field generating means adjacent the non-magnetic wall.

* * * * *